United States Patent
Mukherjee

(10) Patent No.: US 7,775,710 B2
(45) Date of Patent: Aug. 17, 2010

(54) DRAM TEMPERATURE MANAGEMENT SYSTEM

(75) Inventor: Sugato Mukherjee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/220,577

(22) Filed: Jul. 25, 2008

(65) Prior Publication Data

US 2009/0028212 A1 Jan. 29, 2009

Related U.S. Application Data

(62) Division of application No. 11/063,173, filed on Feb. 22, 2005, now Pat. No. 7,413,342.

(51) Int. Cl.
*G01K 7/00* (2006.01)
(52) U.S. Cl. .................... 374/170; 374/178; 327/512
(58) Field of Classification Search ................ 374/170, 374/178; 327/512
See application file for complete search history.

(56) References Cited

U.S. PATENT DOCUMENTS

| | | | |
|---|---|---|---|
| 3,459,925 A | 8/1969 | Wilson et al. | |
| 4,114,442 A | 9/1978 | Pratt | |
| 4,165,642 A | 8/1979 | Lipp | |
| 4,448,549 A | 5/1984 | Hashimoto et al. | |
| 5,319,370 A | 6/1994 | Signore et al. | |
| 5,345,236 A | 9/1994 | Sramek | |
| 5,352,934 A * | 10/1994 | Khan | 327/538 |
| 5,408,235 A | 4/1995 | Doyle et al. | |
| 5,617,090 A | 4/1997 | Ma et al. | |
| 5,859,560 A | 1/1999 | Matthews | |
| 5,867,054 A | 2/1999 | Kotowski | |
| 6,078,208 A * | 6/2000 | Nolan et al. | 327/512 |
| 6,198,267 B1 | 3/2001 | Bakker et al. | |
| 6,242,974 B1 | 6/2001 | Kunst | |
| 6,243,034 B1 | 6/2001 | Regier | |
| 6,310,571 B1 | 10/2001 | Yang et al. | |
| 6,590,372 B1 | 7/2003 | Wiles | |
| 6,714,886 B2 | 3/2004 | Sung et al. | |
| 6,750,796 B1 * | 6/2004 | Holloway et al. | 341/143 |
| 6,869,216 B1 | 3/2005 | Holloway et al. | |
| 7,029,171 B2 | 4/2006 | Tesi et al. | |
| 7,049,987 B2 | 5/2006 | Stoll | |
| 7,057,444 B2 | 6/2006 | Illegems | |

(Continued)

OTHER PUBLICATIONS

Anton Bakker and Johan H. Huijsing; Micropower CMOS Temperature Sensor with Digital Output; IEEE Journal of Solid-State Circuits, vol. 31, No. 7, Jul. 1996.

*Primary Examiner*—Gail Verbitsky
*Assistant Examiner*—Mirellys Jagan
(74) *Attorney, Agent, or Firm*—Dorsey & Whitney LLP

(57) ABSTRACT

A converter comprising a comparator having a first input operable to receive a first signal, a second input operable to receive a second signal, and an output, a switch for sinking a portion of the first signal, wherein the switch is responsive to the output, and an integrator connected to the first input, wherein the first signal is a voltage developed by the integrator when a current proportional to the absolute temperature is applied thereto. A method for measuring temperature of a device using a comparator and converting the bitstream of the comparator to a digital output is also given. Because of the rules governing abstracts, this abstract should not be used to construe the claims.

19 Claims, 9 Drawing Sheets

U.S. PATENT DOCUMENTS

| | | |
|---|---|---|
| 7,075,475 B1 * | 7/2006 | Wan .................. 341/172 |
| 7,082,377 B1 | 7/2006 | Aslan et al. |
| 7,102,555 B2 * | 9/2006 | Collins et al. .............. 341/120 |
| 7,113,881 B2 | 9/2006 | Boerstler et al. |
| 7,126,509 B2 | 10/2006 | Sit et al. |
| 7,127,368 B2 | 10/2006 | Choi |
| 7,173,501 B1 * | 2/2007 | Varricchione .............. 331/176 |
| 7,221,209 B2 | 5/2007 | Ahuja et al. |
| 7,235,999 B2 * | 6/2007 | Goetting et al. ............... 326/9 |
| 7,298,307 B2 | 11/2007 | Takeuchi et al. |
| 2002/0000889 A1 * | 1/2002 | Kim ......................... 331/143 |
| 2003/0034908 A1 | 2/2003 | Nestler et al. |
| 2004/0004994 A1 | 1/2004 | Wu et al. |
| 2004/0036460 A1 * | 2/2004 | Chatal ..................... 323/313 |
| 2005/0001670 A1 | 1/2005 | Kim et al. |
| 2005/0062491 A1 * | 3/2005 | Burns et al. ............... 324/763 |
| 2005/0185491 A1 * | 8/2005 | Kim et al. .................. 365/222 |
| 2007/0008042 A1 * | 1/2007 | Lee et al. ...................... 331/16 |
| 2007/0098041 A1 | 5/2007 | Seo |
| 2007/0157721 A1 | 7/2007 | Veerasamy |
| 2007/0195856 A1 * | 8/2007 | Blom et al. ................ 374/117 |
| 2009/0129438 A1 * | 5/2009 | Pan ........................... 374/170 |

* cited by examiner

US 7,775,710 B2

DRAM TEMPERATURE MANAGEMENT SYSTEM

CROSS-REFERENCE TO RELATED APPLICATIONS

The present application is a divisional application of U.S. application Ser. No. 11/063,173, filed Feb. 22, 2005, issued as U.S. Pat. No. 7,413,342 on Aug. 19, 2008 and entitled "DRAM Temperature Measurement System". This application and patent are hereby incorporated by reference herein, in their entirety, for any purpose.

BACKGROUND

The present invention relates generally to a temperature measurement system for use in integrated circuits and more particularly to a temperature measurement system based on current mode sigma-delta modulation for use within dynamic random access memory (DRAM) devices.

Temperature sensors are used within integrated circuits, for example, to protect against overcurrent damage, to compensate for cross sensitivity of other sensors, to reduce errors caused by self-heating, and to provide process data input, among others. Increasingly, complimentary-metal-oxide-semiconductor (CMOS) devices are used as temperature sensors due to the ease of incorporating these devices into the integrated circuit.

FIG. 7 illustrates a temperature measurement system according to the prior art. The temperature measurement system includes a temperature sensor 100, a bandgap voltage reference circuit 102, a sigma-delta converter 104, a counter 106, and a controller 108, among others. The temperature measurement system is used to convert an analog temperature reading, as produced by temperature sensor 100, into a digital output.

The forward voltage of a diode decreases linearly with temperature. Utilizing this characteristic, methods and circuits to derive temperature and reference signals from CMOS devices have been developed and are well known. Thus, a detailed discussion of such methods and circuits is omitted herein. Temperature sensor 100 may be a CMOS device comprised of p-channel and/or n-channel transistors. As seen in FIG. 7, temperature sensor 100 produces a temperature dependent current ($I_{TEMP}$) that is provided to sigma-delta converter 104.

Reference circuit 102 is comprised of precision analog components and produces a reference current ($I_{REF}$) and a reference voltage ($V_{REF}$). The reference current ($I_{REF}$) and the reference voltage ($V_{REF}$) may also be referred to as the bandgap reference current ($I_{BGref}$) and bandgap reference voltage ($V_{BGref}$), respectively. Both $I_{REF}$ and $V_{REF}$ are temperature independent. Although capable of producing a temperature independent current and a temperature independent voltage, the precision analog components used by reference circuit 102 are costly and require band-gap type tuning. As seen in FIG. 7, $I_{REF}$ and $V_{REF}$ are provided to sigma-delta converter 104.

Sigma-delta converter 104 uses $I_{TEMP}$, $I_{REF}$, and $V_{REF}$ to produce a bitstream that is provided to counter 106. Counter 106 uses the bitstream to produce a digital output representing the temperature sensed by temperature sensor 100. Controller 108 controls the overall operation of the temperature measurement system. For example, controller 108 issues "power_on", "reset", and "enable" signals (among others) to the other components of the temperature measurement system.

FIG. 8 illustrates a simplified circuit diagram of the prior art sigma-delta converter 104 of FIG. 7. Sigma-delta converter 104 includes switches 120, 122, a capacitor 124, an op-amp 126, a comparator 128, and a flip-flop register 130. In operation, Switch 120 is responsive to a feedback loop from the output of flip-flop register 130. $I_{TEMP}$ (e.g., from temperature sensor 100 as shown in FIG. 7) is added to $I_{REF}$ when switch 120 is closed. The combined signal is then fed to an integrator which, as shown in FIG. 8, is formed by the combination of op-amp 126, capacitor 124, and switch 122. Switch 122 is responsive to a reset signal. If switch 122 is in its open state (and switch 120 is in its closed state), $I_{TEMP}$ and $I_{REF}$ cause a voltage to develop across capacitor 124. This voltage also develops at the output of op-amp 126, which is fed to the non-inverting input of comparator 126. The output of the op-amp 126 is compared to a reference signal (e.g., ground) by comparator 128 and the output of the comparator 128 is fed to an input of flip-flop register 130. The output of the flip-flop register 130 carries a bitstream which, as discussed above, is fed back to switch 120 and also fed to a counter (not shown in FIG. 8). The counter (e.g., counter 106 as shown in FIG. 7) tracks the number of "1" decisions made by comparator 128 in a predetermined time period and produces the digital output representing the temperature sensed by the temperature sensor 100.

The prior art temperature measurement system's resolution, power consumption, and need for band-gap type tuning, however, are not adequate for certain integrated circuit applications. Additionally, the sigma-delta converter's 104 use of $I_{REF}$ and $V_{REF}$ fails to insure adequate operation at low voltages (e.g., 1.2 V and below). With respect to resolution, for example, the output of comparator 122 is fed to counter 106 as discussed above. The counter 106 is activated for predetermined time period (e.g., 100 cycles of a self-generated clock signal). After this predetermined time period expires, the counter's 106 output is read and the sensing operation is completed. For a typical prior art temperature measurement system operated at a temperature range between approximately −40° C. and 110° C., the counter 106 range is approximately 15 for every 100 times a sample of the comparator output is taken.

Accordingly, a need exists for a temperature measurement system which overcomes these problems and which overcomes other limitations inherent in prior art.

SUMMARY

One aspect of the invention relates to a converter comprising a comparator having a first input operable to receive a first signal, a second input operable to receive a second signal, and an output, a switch for sinking a portion of the first signal, wherein the switch is responsive to the output, and an integrator connected to the first input, wherein the first signal is a voltage developed by the integrator when a current proportional to the absolute temperature is applied thereto.

Another aspect of the invention relates to a temperature measurement system comprising a temperature sensor, a converter operable to receive one or more signals from the temperature sensor, and a counter, the converter comprising a comparator having a first input operable to receive a first signal, a second input operable to receive a second signal, and an output, a switch for sinking a portion of the first signal, wherein the switch is responsive to the output and an integrator connected to the first input, wherein the first signal is a voltage developed by the integrator when a current proportional to the absolute temperature is applied thereto, wherein the counter is responsive to the output for producing an output signal.

Another aspect of the invention relates to a memory system comprising a memory module, a memory controller in communication with the memory module via a system bus, and a temperature measurement module. The temperature measurement module comprises a temperature sensor, a converter operable to receive one or more signals from the temperature sensor, and a counter responsive to the output for producing an output signal, wherein the converter comprises a comparator having a first input operable to receive a first signal, a second input operable to receive a second signal, and an output, and a switch for sinking a portion of said first signal, wherein said switch is responsive to said output, and an integrator connected to said first input, wherein said first signal is a voltage developed by said integrator when a current proportional to the absolute temperature is applied thereto.

Another aspect of the invention relates to a method for measuring temperature comprising comparing a first signal, proportional to a sensed absolute temperature, to a reference signal, and generating a bitstream in response to said comparison. The reference signal may be inversely proportional to the absolute temperature.

BRIEF DESCRIPTION OF THE DRAWINGS

To enable the present invention to be easily understood and readily practiced, the present invention will now be described for purposes of illustration and not limitation, in connection with the following figures wherein.

DETAILED DESCRIPTION

The detailed description sets forth specific embodiments that are described in sufficient detail to enable those skilled in the art to practice the present invention. It should be apparent to those skilled in the art that other embodiments may be utilized, and that logical, mechanical, and electrical changes may be made, while remaining within the scope of the present invention. The following detailed description is, therefore, not to be taken in a limiting sense, and the scope of the invention is defined only by the appended claims.

Figure 1:
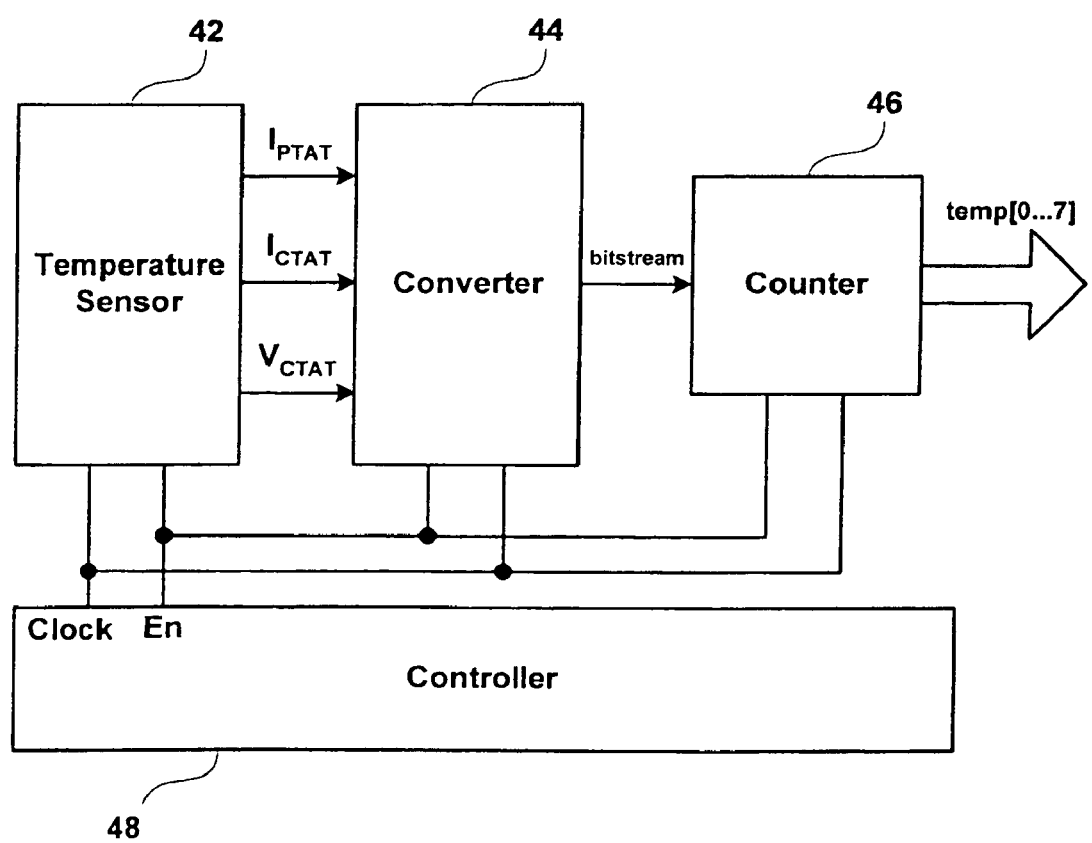
FIG. 1 is a simplified diagram of a temperature measurement module according to one embodiment.

FIG. 1 is a simplified diagram of a temperature measurement module 4 according to one embodiment. The temperature measurement module 4 includes a CMOS temperature sensor 42, a sigma-delta converter 44, a counter 46, and a controller 48, among others. The temperature measurement module 4 converts an analog temperature reading (i.e., from the temperature sensor 42) into a digital output.

In the current embodiment, the temperature sensor 42 includes a vertical bipolar transistor. It should be apparent to one skilled in the art, however, that other types of devices might be used (for example, a CMOS transistor operating in weak inversion, a lateral bipolar transistor, Schottky diodes, etc.) while remaining within the scope of the present invention. Temperature sensor 42 produces a current proportional to absolute temperature ($I_{PTAT}$), a current complementary to absolute temperature ($I_{CTAT}$), and a voltage complementary to absolute temperature ($V_{CTAT}$), each of which are provided to converter 44.

Figure 1A:
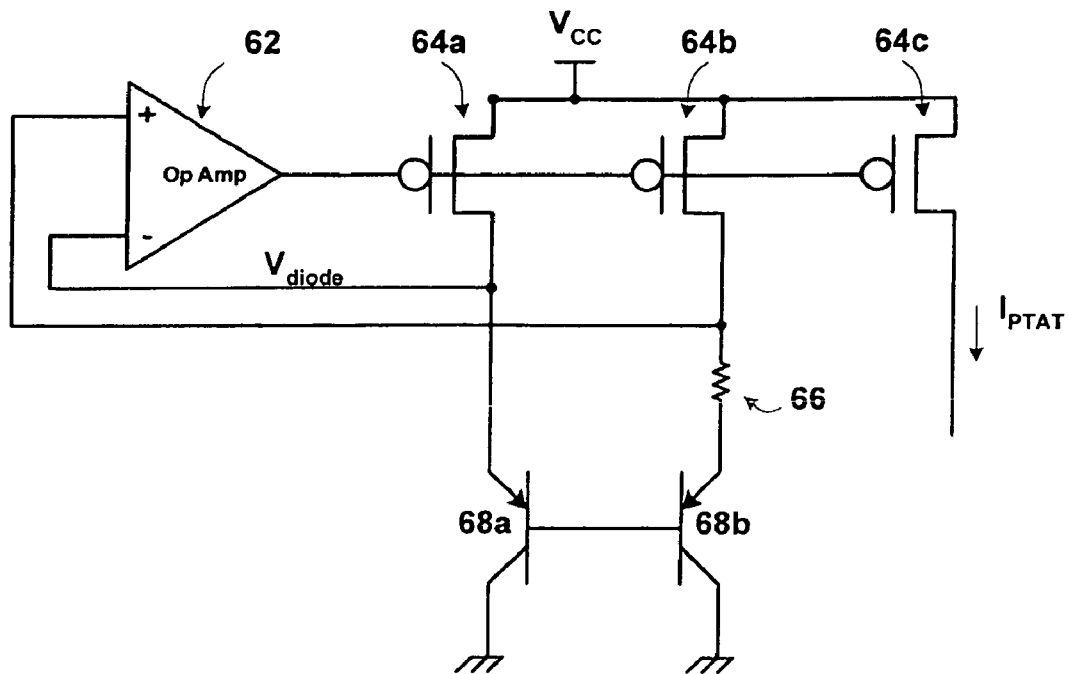
FIGS. 1A and 1B are simplified diagrams of circuits for producing $I_{PTAT}$ and $I_{CTAT}$, respectively, according to one embodiment.
Figure 1B:
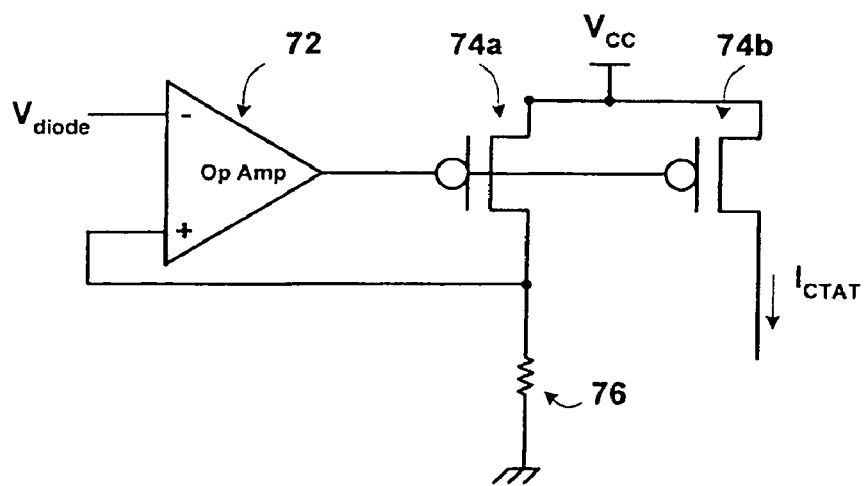

FIGS. 1A and 1B are simplified diagrams of circuits for producing $I_{PTAT}$ and $I_{CTAT}$, respectively, according to one embodiment. Referring briefly to FIG. 1A, current generator 60 includes an op amp 62, PMOS transistors 64a, 64b, 64c, resistor 66, and diodes 68a, 68b. In the current embodiment, diodes 68a, 68b are vertical p-n-p diodes. The non-inverting input of op-amp 62 is connected to a node located between PMOS transistor 64b and resistor 66 such that the voltage produced across resistor 66 is applied to the non-inverting input. The inverting input of op-amp 62 is connected to a node between PMOS transistor 64a and diode 68a such that the voltage ($V_{diode}$) produced across diode 68a is applied to the inverting input. The output of op amp 62 is applied to the gates of PMOS transistors 64a, 64b, 64c. In the current embodiment, PMOS transistors 64a, 64b, 64c act as current sources. The output of PMOS transistor 64c is $I_{PTAT}$. For clarity, the transistors 64a, 64b, 64c illustrated in FIG. 1A are single PMOS transistors, however, it should be apparent to one skilled in the art that other types of transistors may be used while remaining within the scope of the present invention. For example, cascaded PMOS transistors may be used for PMOS transistors 64a, 64b, 64c while remaining within the scope of the present invention.

Referring briefly to FIG. 1B, current generator 70 includes an op amp 72, PMOS transistors 74a, 74b, and resistor 76. The non-inverting input of op-amp 62 is connected to a node located between PMOS transistor 74a and resistor 76 such that the voltage produced across resistor 76 is applied to the non-inverting input. The inverting input of op-amp 62 is connected to the voltage ($V_{diode}$) that is produced as discussed above. The output of op amp 72 is applied to the gates of PMOS transistors 74a, 74b. In the current embodiment, PMOS transistors 74a, 74b act as current sources. The output of PMOS transistor 64b is $I_{CTAT}$. For clarity, the transistors 74a, 74b illustrated in FIG. 1A are single PMOS transistors, however, it should be apparent to one skilled in the art that other types of transistors may be used while remaining within the scope of the present invention. For example, cascoded PMOS transistors may be used for PMOS transistors 74a, 74b for better power supply rejection and other performance parameters while remaining within the scope of the present invention.

Returning to FIG. 1, converter 44 uses $I_{PTAT}$, $I_{CTAT}$, and $V_{CTAT}$, to produce a bitstream that is provided to counter 46. Counter 46 uses the bitstream output to produce a digital output representing the temperature reading. Controller 48 regulates the temperature sensor 42, converter 44, and counter 46 in the current embodiment. For example, controller 48 issues "clock" and "enable" signals (among others) to the temperature sensor 42, converter 44, and counter 46.

Figure 2:
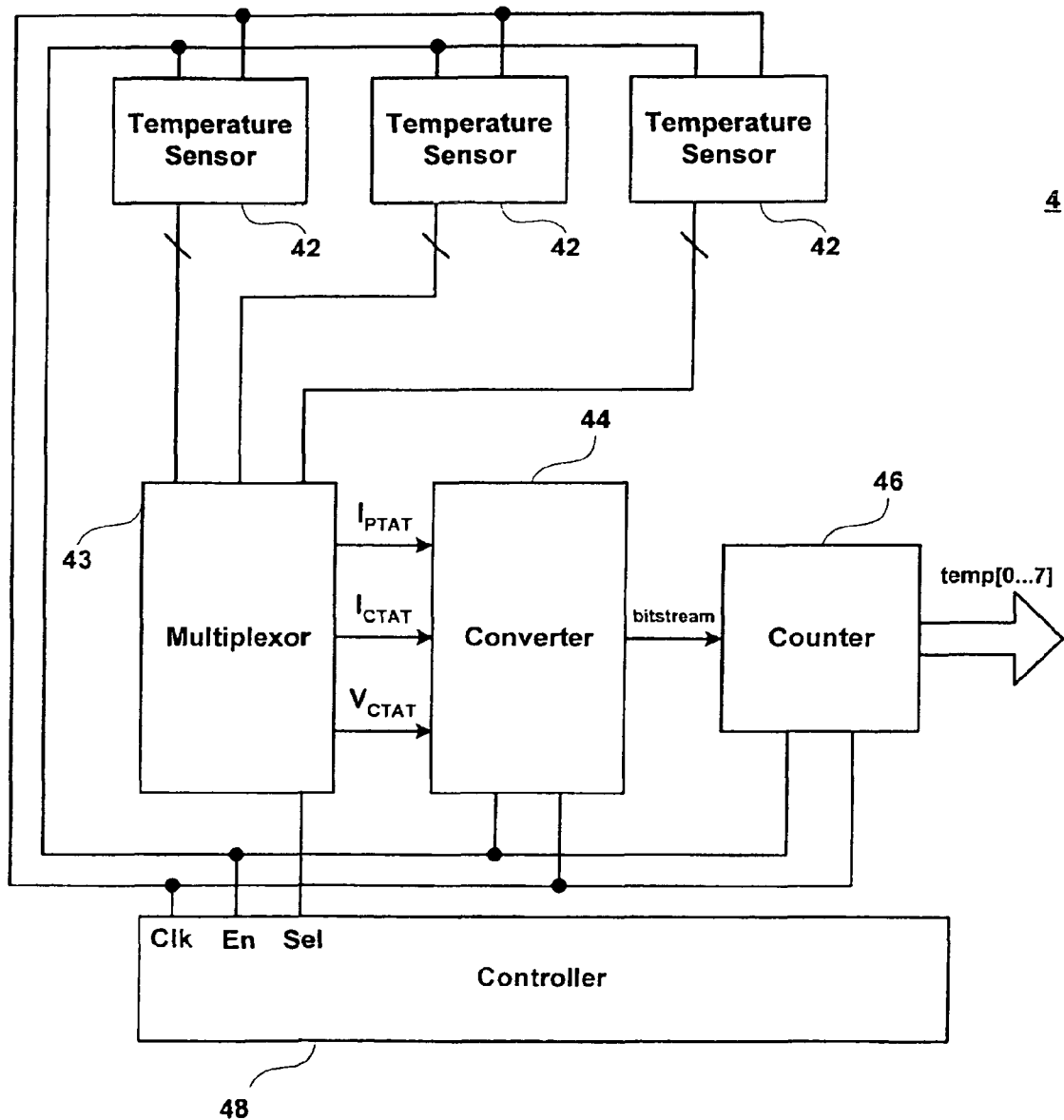
FIG. 2 is a simplified diagram of a temperature measurement module according to another embodiment.

The temperature measurement module 4 illustrated in FIG. 1 employs a single temperature sensor. In an alternative embodiment, the temperature measurement module 4 may employ a plurality of temperature sensors while remaining within the scope of the present invention. FIG. 2 illustrates a temperature measurement module 4 having a plurality of temperature sensors 42 according to one embodiment. As seen in FIG. 2, each temperature sensor 42 is connected to a multiplexer 43. In the current embodiment, controller 48 issues a "select" command to the multiplexer 43 such that multiplexer 43 passes the output from the selected temperature sensor 42 to the converter 44. Once the particular temperature sensor 42 is selected, the temperature measurement module 4 shown in FIG. 2 functions the same way as the temperature measurement module 4 shown in FIG. 1. It should be noted that the criteria used to select a particular temperature sensor 42 may vary according to certain design choices. For example, depending upon their locations within an integrated circuit, a first temperature sensor 42 may be selected twice as often as a second temperature sensor 42.

Figure 3:
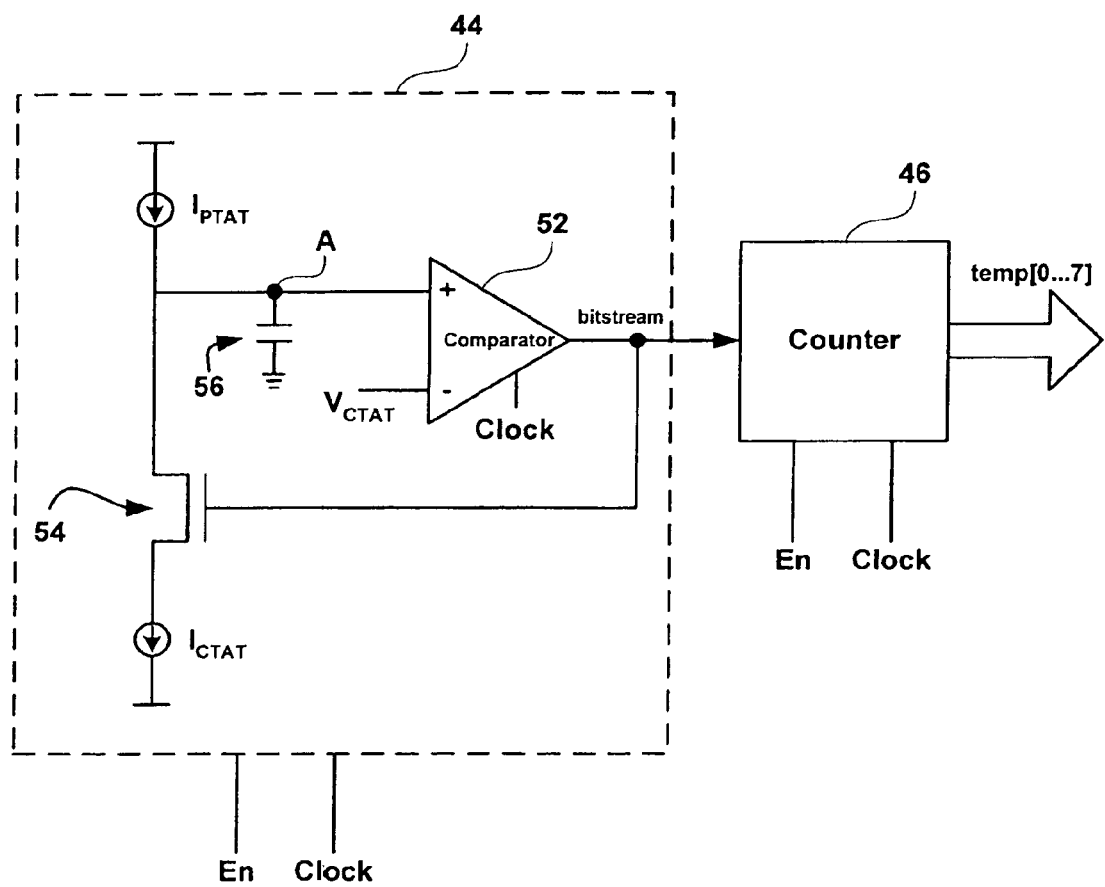
FIG. 3 is a simplified diagram of a portion of the temperature measurement module of FIG. 1 and/or FIG. 2 according to one embodiment.

FIG. 3 is a simplified diagram of a portion of the temperature measurement module 4 of FIG. 1 and/or FIG. 2 according to one embodiment. More specifically, FIG. 3 illustrates a more detailed view of the sigma-delta converter 44 in combination with the counter 46. The converter 44 includes a capacitor 56, a clocked comparator 52, and a transistor 54. The capacitor 56 acts as a signal integrator. It should be apparent to one skilled in the art that other types of integrators may be used while remaining within the scope of the present invention. Additionally, as previously discussed, a "clocked comparator" refers to a comparator that compares two inputs and asserts the output signal once every clock cycle (e.g., a comparator whose output changes only once per clock cycle).

In operation, $I_{PTAT}$ from temperature sensor 42 (as shown in FIG. 1) or from the selected temperature sensor 42 (as shown in FIG. 2) causes a voltage ("sigma") to develop across capacitor 56 at node A. This voltage, which may also be referred to as $V_{CAP}$, is provided to the non-inverting input of comparator 52. When $V_{CAP}$ exceeds $V_{CTAT}$, the comparator output (i.e., the bitstream) goes high causing transistor 54 to conduct. When activated, transistor 54 sinks $I_{CTAT}$ (i.e., "delta"), thus discharging capacitor 56 and causing $V_{CAP}$ to decrease. When $V_{CAP}$ falls below $V_{CTAT}$, the comparator output goes low, thus de-activating transistor 54. As seen in FIG. 3, the comparator output is also connected to an input of counter 46. Counter 46 counts the number of "1" decisions made by the comparator 52 and produces a digital output representing the temperature as sensed by the temperature sensor 42 (i.e., counter 46 counts the number of times the comparator output goes high within a predetermined time period, such as 100 clock cycles).

Figure 4A:
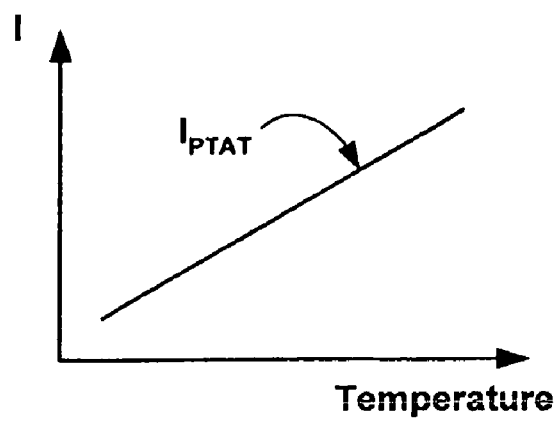
FIG. 4A is a simplified diagram illustrating the relationship between $I_{PTAT}$ and temperature according to one embodiment.
Figure 4B:
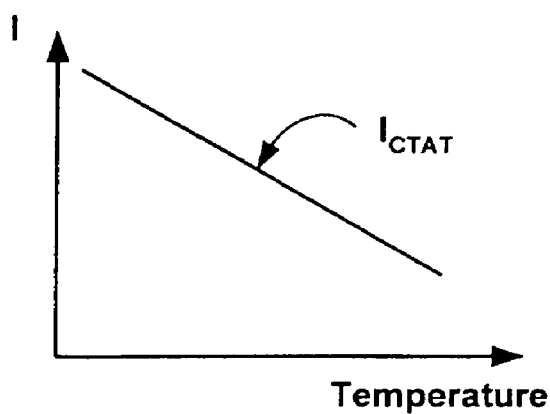
FIG. 4B is a simplified diagram illustrating the relationship between $I_{CTAT}$ and temperature according to one embodiment.
Figure 4C:
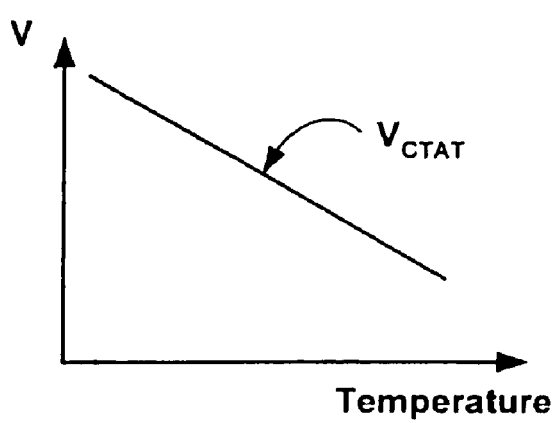
FIG. 4C is a simplified diagram illustrating the relationship between $V_{CTAT}$ and temperature according to one embodiment.

FIG. 4A is a simplified diagram illustrating the relationship between $I_{PTAT}$ and temperature for the temperature measurement module 4 according to one embodiment. As seen in FIG. 4A, $I_{PTAT}$ is directly proportional to temperature (i.e., as temperature increases, $I_{PTAT}$ increases). FIGS. 4B and 4C are simplified diagrams illustrating the relationship between $I_{CTAT}$ and temperature and between $V_{CTAT}$ and temperature, respectively, for the temperature measurement module 4 according to one embodiment. As seen in FIGS. 4B and 4C, $I_{CTAT}$ and $V_{CTAT}$ are inversely proportional to temperature (i.e., as temperature increases, $I_{CTAT}$ and $V_{CTAT}$ each decrease).

The use of $I_{CTAT}$ (i.e., as the delta current source) in combination with a reference voltage enables increased resolution for the temperature measurement module 4. Additionally, using a capacitor as an integrator instead of an op-amp based integrator removes complexities associated with designing low voltage op-amps. In the current embodiment, for example, using $I_{CTAT}$ (i.e., as the delta current source) and $V_{CTAT}$ (i.e., as the reference in the comparator) in contrast to $I_{REF}$ and $V_{REF}$, respectively, increases the effective resolution of the temperature measurement module 4 without using precision analog components as required by the prior art. With increasing temperature, $I_{PTAT}$ increases while $I_{CTAT}$ decreases. This improves the resolution of the temperature sensor 42. For example, when the comparator 52 is sampled 100 times, the counter range goes from about 15 when using $I_{REF}$ and $V_{REF}$ (as discussed above in conjunction with the prior art temperature measurement system) to approximately 55 when using $I_{CTAT}$ and $V_{CTAT}$ (e.g., for a temperature range between approximately −40° C. and 110° C.). It should be noted that another reference voltage may be used as the reference for the comparator while remaining within the scope of the present invention. It should further be noted that the reference voltage need not have the same properties as $V_{CTAT}$ (e.g., as temperature increases, the reference voltage need not decrease) to remain within the scope of the present invention.

Additionally, the use of $I_{CTAT}$ and $V_{CTAT}$ ensures adequate operation at lower voltages (e.g., 1.2 V and below) and eliminates the precision band-gap type tuning required to generate a fixed $V_{REF}$ by the prior art circuits.

Figure 5:
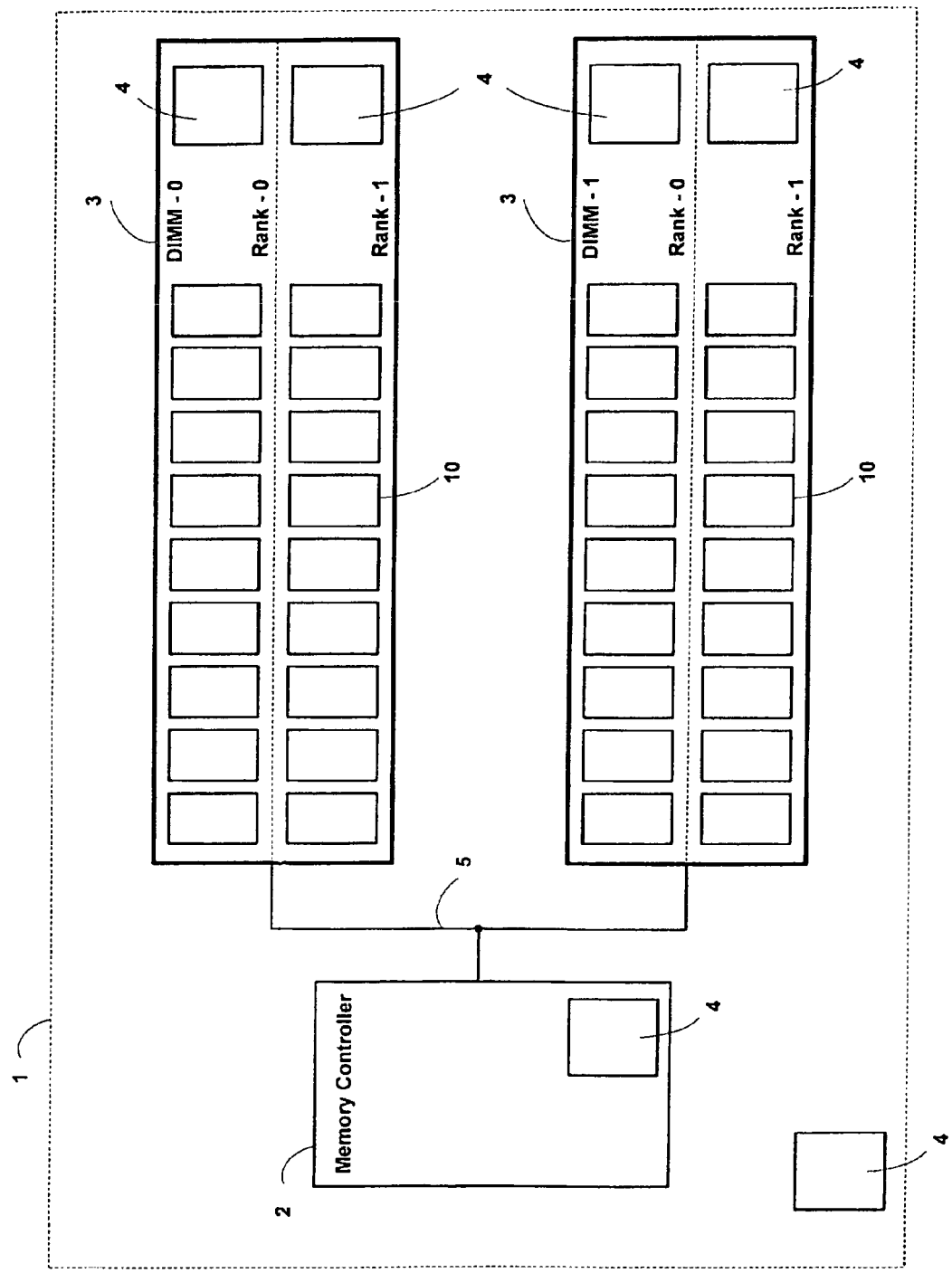
FIG. 5 is a simplified block diagram of a memory system according to one embodiment.

FIG. 5 is a simplified block diagram of a memory system 1 according to one embodiment. The memory system 1 includes a memory controller 2, two (2) dual-inline-memory-modules 3 (i.e., DIMM-0, DIMM-1), and one or more temperature measurement modules 4 (as illustrated in FIG. 1 and/or FIG. 2). Each memory module 3 is divided into two (2) ranks (Rank-0, Rank-1), each rank being comprised of nine (9) synchronous dynamic random access memory (SDRAM) devices 10. The memory system 1 may be utilized as a component within a larger system, for example, within a computer system having a processor, a storage device, a display, etc.

The memory controller 2 and memory modules 3 communicate via a system bus 5. In the current embodiment, the system bus 5 carries command signals, address signals, and data signals, among others. The system bus 5 may be subdivided into two or more buses, for example a command bus, an address bus, and a data bus. The command bus may carry the row address strobe (RAS#), column address strobe (CAS#), and write enable (WE#) command signals, among others. The address bus may carry bank address (BA0, BA1) and address input (A0-A12) signals, among others. The data bus may carry data input/output signals (DQ0-DQ15), data strobe signals (LDQS, LDQS#, UDQS, UDQS#), and data mask signals (LDM, UDM), among others. Additionally, rank specific command signals, such as the chip select (CS#), clock enable (CKE), and on-die termination (ODT) signals may be carried by another portion of the system bus 5. It should be apparent to one skilled in the art that the topology of the system bus 5 (and its component parts) may be varied while remaining within the scope of the present invention.

The temperature measurement modules 4 may be distributed throughout the memory system 1. For example as shown in FIG. 5, temperature memory modules 4 are shown located within the memory controller 2, within each rank of each memory module 3, and within the unused die space of the memory system 1. Temperature memory modules 4 may also be incorporated into one or more of the SDRAMs 10 (not shown in FIG. 5). Accordingly, the temperature memory modules 4 may be employed to protect the memory system 1 and/or its components against overcurrent damage, to compensate for cross sensitivity of other sensors, to reduce errors caused by self-heating, and to provide process data input, among others. For example, the output of one or more of the temperature measurement modules 4 may be used by the memory controller 2 and/or a microprocessor (not shown) to regulate power supplied to the memory device 1 and to prevent overheating, among others.

It should be apparent to one skilled in the art the number of temperature measurement modules 4 employed and/or their location(s) within the memory system 1 may be varied while remaining within the scope of the present invention. Additionally, it should be apparent to one skilled in the art that a single temperature measurement module 4 having a plurality of temperature sensors (for example, as best illustrated in FIG. 2) may be employed while remaining within the scope of the present invention.

It should further be apparent to one skilled in the art that the use of the temperature measurement module 4 within a memory device is for exemplary purposes only and is not intended, in any manner, to limit the scope of the present invention. The temperature measurement module 4 may be used with other types of devices may be used while remaining within the scope of the present invention.

Figure 6:
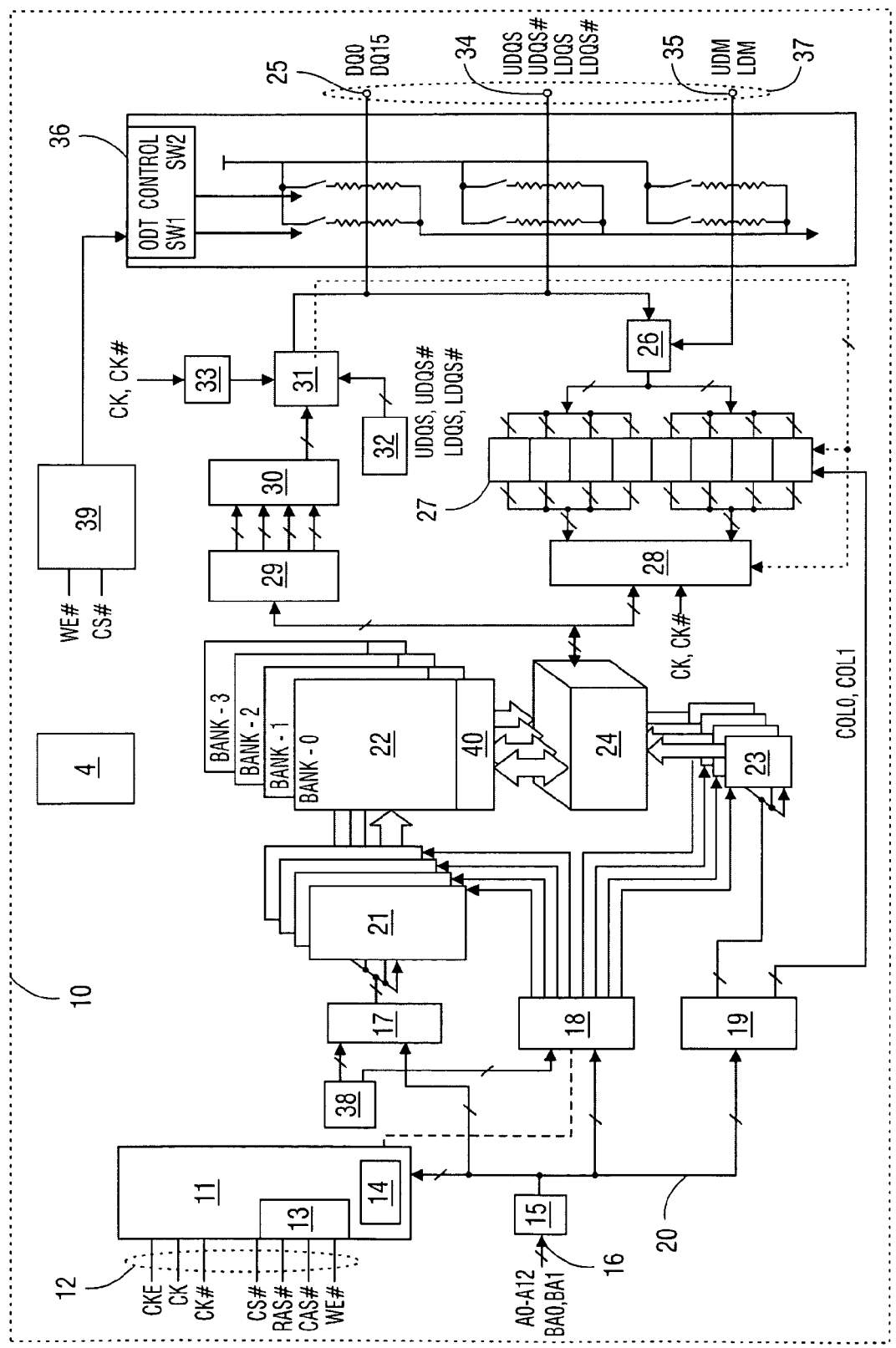
FIG. 6 illustrates a simplified functional block diagram of an architecture for a memory device of FIG. 1 according to one embodiment.
Figure 7:
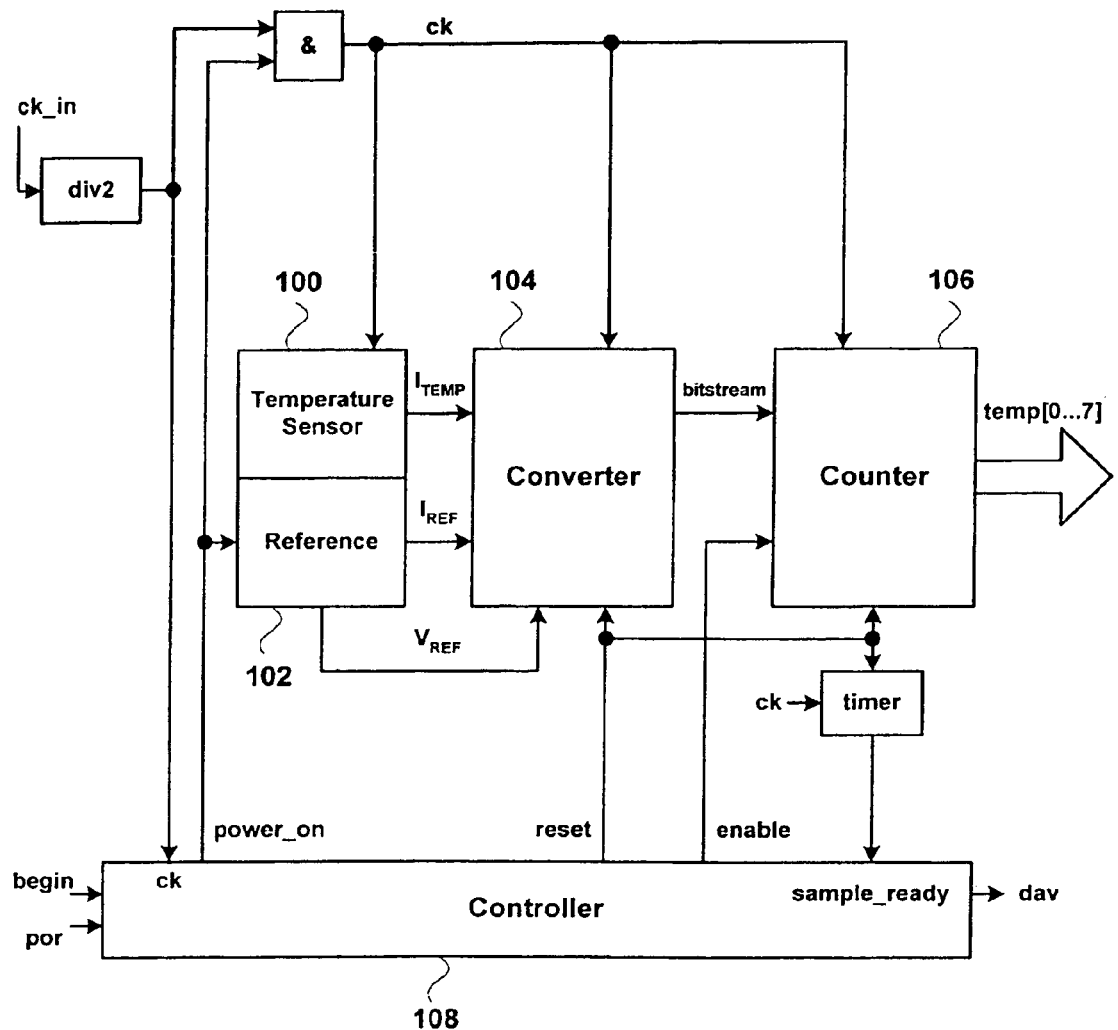
FIG. 7 illustrates a temperature measurement system according to the prior art.
Figure 8:
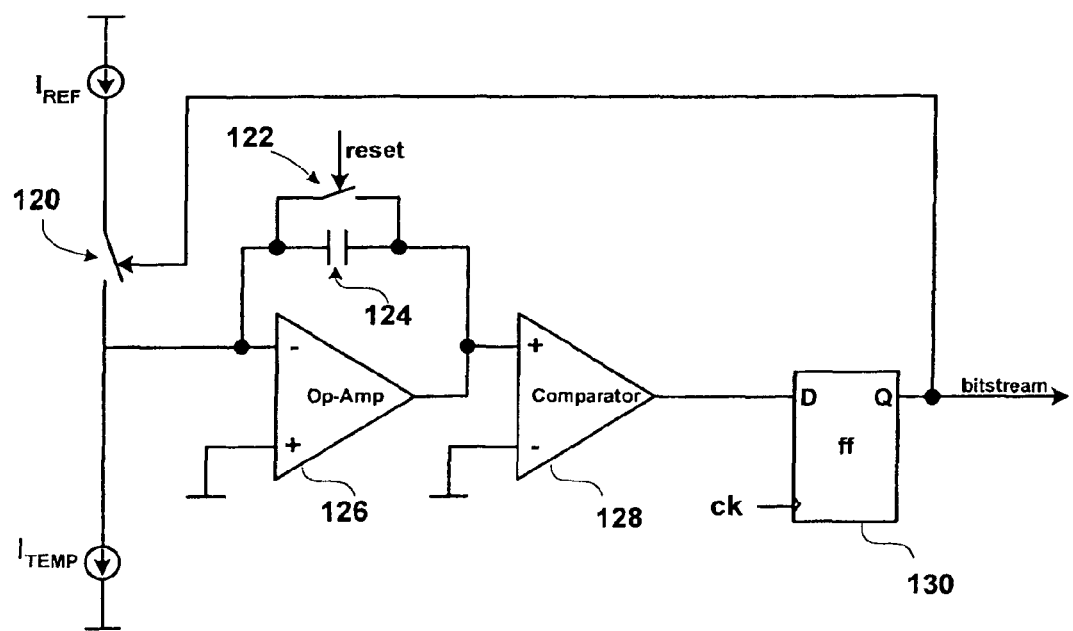
FIG. 8 illustrates a simplified circuit diagram of the sigma-delta converter of FIG. 7 according to the prior art.

FIG. 6 illustrates a simplified functional block diagram of an architecture for an SDRAM 10 of FIG. 5 according to one embodiment. The SDRAM 10 may include a temperature measurement module 4 for measuring the temperature within the SDRAM 10. The SDRAM 10 includes control logic 11 responsive to a plurality of command signals (e.g., CS#, RAS#, CAS#, WE#, CKE, CK, CK#, ADR, BA, etc.) from a command bus 12. The control logic 11 includes a command decode circuit 13 and mode register circuits 14, among others. Table 1 illustrates a truth table for the command coding of the SDRAM 10 according to the one embodiment.

TABLE 1

SDRAM Coding Truth Table (L = 0, active; H = 1, inactive).

| FUNCTION | CKE Previous Cylcle | CKE Current Cycle | CS# | RAS# | CAS# | WE# |
|---|---|---|---|---|---|---|
| Write | H | H | L | H | L | L |
| Read | H | H | L | H | L | H |
| Bank Activate | H | H | L | L | H | H |
| Load Mode | H | H | L | L | L | L |
| Refresh | H | H | L | L | L | H |
| Self-Refresh Entry | H | L | L | L | L | H |
| Self-Refresh Exit | L | H | H | X | X | X |
|  |  |  | L | H | H | H |
| Precharge | H | H | L | L | H | L |
| No Operation | H | X | L | H | H | H |

Referring to Table 1 for example, when the memory controller 2 sets CS#=L, RAS#=H, CAS#=L and WE#=L, the command decode circuit 13 decodes the signals as a write command function. It should be apparent to those skilled in the art that different and/or additional signals (e.g., BA, ADR, etc.) may be used to encode each command function. It should further be apparent to one skilled in the art that the specific state of each command signal (i.e., CS#, RAS#, etc.) used to define each command function (i.e., write, read, etc.) may be altered while remaining within the scope of the present invention.

The SDRAM 10 also includes an address register 15 responsive to an address bus 16 that carries a plurality of address signals (e.g., A0-A12, BA0, BA1, etc.). The control logic 11 and the address register 15 communicate with each other, and with a row address multiplexer circuit 17, a bank control logic circuit 18, and a column address counter/latch circuit 19, via an internal bus 20.

The bank control logic 18 is responsive to the control logic 11, the address register 15, and a refresh counter 38. The row address multiplexer 17 is also responsive to the control logic 11, the address register 15, and the refresh counter 38. A series of row latch/decoders 21 are responsive to the bank control logic 18 and the row address multiplexer 17. One row latch/decoder 21 is provided for each memory array 22. Each memory array 22 is comprised of a plurality of memory cells each operable to store one bit of information. Four memory arrays 22, labeled bank 0 through bank 3, are illustrated in FIG. 6. Accordingly, there are four row latch/decoder circuits 21, one each for controlling bank 0 through bank 3.

The column address counter/latch circuit 19 is responsive to the control logic 11 and the address register 15. A series of column decoders 23 are responsive to the bank control logic 18 and the column address counter/latch 19. One column decoder 23 is provided for each memory array 22. As discussed above, SDRAM 10 includes four memory arrays 22 labeled bank 0 through bank 3. Accordingly, there are four column decoder circuits 23, one each for controlling bank 0 through bank 3. An I/O gating circuit 24 is responsive to the column decoder circuits 23 for controlling sense amplifiers 40 within each of the memory arrays 22.

The SDRAM 10 may be accessed through a plurality of data pads 25 for either a write operation or a read operation. For a write operation, data on data pads 25 is received by receivers 26 and passed to input registers 27. A write buffer/driver circuit 28 buffers the received data which is then input to the memory arrays 22 through the I/O gating circuit 24.

Data that is to be read from the memory arrays 22 is output through the I/O gating circuit 24 to a read latch 29. From the read latch 29, the information is input to a multiplexer circuit 30, which outputs the data onto the data pads 25 through drivers 31. The drivers 31 are responsive to a data strobe generator 32 and to a delay locked loop circuit 33. The data strobe generator 32 is operable to produce data strobes for upper and lower bytes (i.e., UDQS, UDQS#, LDQS, and LDQS#) as is known in the art. The data strobes are also provided to data strobe output pads 34, input registers 27, and to the write buffer/driver 28, among others. The SDRAM 10 also includes input data mask pads 35 for receiving upper data mask signals (UDM) and lower data mask signals (LDM) for the upper bytes (DQ8-DQ15) and lower bytes (DQ0-DQ7), respectively. The data pads 25, data strobe output pads 34, and data mask pads 35 may be part of a data bus 37.

The SDRAM 10 includes an on-die termination (ODT) circuit 36 that is operable to apply an effective resistance Rtt (e.g., R1 or R2) to the data pads 25, data strobe output pads 34, and input data mask pads 35 (or to another portion of the data bus). An ODT activation circuit 39 is used to control whether the ODT circuit 36 is enabled/disabled, and thus whether Rtt is applied. In the embodiment illustrated in FIG. 6, the ODT activation circuit 39 receives the WE# and CS# signals which are sent by the system controller 2 to the DIMMs 3 and to each SDRAM 10. These signals may be rank specific (e.g., WE0# and CS#0 for rank-0, WE#1 and CS#1 for rank-1, etc.).

It should be apparent to one skilled in the art that the position of the temperature measurement module 4 within the SDRAM 10 (as illustrated in FIG. 6) may be altered while remaining within the scope of the present invention. The positioning may be dependent upon the purpose to be served by the temperature measurement module 4 (e.g., to protect against overcurrent damage, to compensate for cross sensitivity of other sensors, to reduce errors caused by self-heating, to provide process data input, etc.). It should further be apparent to one skilled in the art that the use of SDRAM 10 is for exemplary purposes only and that other types of memory devices may be used while remaining within the scope of the present invention.

It should be apparent to those of ordinary skill in the art that equivalent logic or physical circuits may be constructed using alternate logic elements while remaining within the scope of the present invention. It should further be recognized that the above-described embodiments of the invention are intended to be illustrative only. Those skilled in the art may devise numerous alternative embodiments without departing from the scope of the following claims.

What is claimed is:

1. A method for producing a signal representative of temperature, comprising:
    producing a first current proportional to temperature using a first circuit;
    producing a second current inversely proportional to said temperature using a second circuit;
    selectively using said first current to charge a capacitor and selectively using said second current to discharge said capacitor; and
    comparing the charge on said capacitor to a reference voltage to produce a bitstream representative of said temperature.

2. The method of claim 1 wherein said producing a first current comprises:
    inputting an output signal from an operational amplifier to a control terminal of each of a plurality of transistors;
    inputting a signal developed across a diode to an inverting input terminal of said operational amplifier, said diode being responsive to a first one of said plurality of transistors; and
    inputting a signal developed across a resistor and a diode connected in series to a non-inverting input terminal of said operational amplifier, said resistor and diode being responsive to a second one of said plurality of transistors, wherein said first current is available at an output terminal of a third one of said plurality of transistors.

3. The method of claim 1 wherein said producing a second current comprises:
    inputting a signal from an operational amplifier to a control terminal of each of a plurality of transistors;
    inputting a signal developed across a diode to an inverting input terminal of said operational amplifier, said diode being responsive to a first one of said plurality of transistors; and
    inputting a signal developed across a resistor to a non-inverting input terminal of said operational amplifier, said resistor being responsive to a second one of said plurality of transistors, wherein said second current is available at an output terminal of a third one of said plurality of transistors.

4. The method of claim 1 additionally comprising counting the number of transitions in said bitstream.

5. The method of claim 1 wherein said selectively using comprises using said first current to charge said capacitor and selectively connecting said second current to said capacitor to discharge said capacitor.

6. The method of claim 5 wherein said selectively connecting comprises using said bitstream to operate a switch to control the application of said second current to said capacitor.

7. The method of claim 6 wherein said selectively connecting comprises inputting said bitstream to a control terminal of a transistor.

8. A method for producing a signal representative of temperature, comprising:
    producing a first current proportional to a temperature using a first circuit;
    producing a second current inversely proportional to said temperature using a second circuit;
    selectively using said first current to charge a capacitor and selectively using said second current to discharge said capacitor; and
    comparing the charge on said capacitor to a reference voltage inversely proportional to said temperature to produce a bitstream representative of said temperature.

9. The method of claim 8 wherein said producing a first current comprises:
    inputting an output signal from an operational amplifier to a control terminal of each of a plurality of transistors;
    inputting a signal developed across a diode to an inverting input terminal of said operational amplifier, said diode being responsive to a first one of said plurality of transistors; and
    inputting a signal developed across a resistor and a diode connected in series to a non-inverting input terminal of said operational amplifier, said resistor and diode being responsive to a second one of said plurality of transistors, wherein said first current is available at an output terminal of a third one of said plurality of transistors.

10. The method of claim 8 wherein said producing a second current comprises:
    inputting a signal from an operational amplifier to a control terminal of each of a plurality of transistors;
    inputting a signal developed across a diode to an inverting input terminal of said operational amplifier, said diode being responsive to a first one of said plurality of transistors; and
    inputting a signal developed across a resistor to a non-inverting input terminal of said operational amplifier, said resistor being responsive to a second one of said plurality of transistors, wherein said second current is available at an output terminal of a third one of said plurality of transistors.

11. The method of claim 8 additionally comprising counting the number of transitions in said bitstream.

12. The method of claim 8 wherein said selectively using comprises using said first current to charge said capacitor and selectively connecting said second current to said capacitor to discharge said capacitor.

13. The method of claim 12 wherein said selectively connecting comprises using said bitstream to operate a switch to control the application of said second current to said capacitor.

14. The method of claim 13 wherein said selectively connecting comprises inputting said bitstream to a control terminal of a transistor.

15. A method for producing a count representative of temperature, comprising:

producing a first current proportional to temperature using a first circuit;

producing a second current inversely proportional to said temperature using a second circuit;

controlling the charge on a capacitor by using said first current to charge said capacitor and selectively using said second current to discharge said capacitor;

comparing the charge on said capacitor to a reference voltage inversely proportional to said temperature to produce a bitstream; and counting the number of transitions in said bitstream to produce a count representative of said temperature.

16. The method of claim 15 wherein said producing a first current comprises:

inputting an output signal from an operational amplifier to a control terminal of each of a plurality of transistors;

inputting a signal developed across a diode to an inverting input terminal of said operational amplifier, said diode being responsive to a first one of said plurality of transistors; and inputting a signal developed across a resistor and a diode connected in series to a non-inverting input terminal of said operational amplifier, said resistor and diode being responsive to a second one of said plurality of transistors, wherein said first current is available at an output terminal of a third one of said plurality of transistors.

17. The method of claim 15 wherein said producing a second current comprises:

inputting a signal from an operational amplifier to a control terminal of each of a plurality of transistors;

inputting a signal developed across a diode to an inverting input terminal of said operational amplifier, said diode being responsive to a first one of said plurality of transistors; and inputting a signal developed across a resistor to a non-inverting input terminal of said operational amplifier, said resistor being responsive to a second one of said plurality of transistors, wherein said second current is available at an output terminal of a third one of said plurality of transistors.

18. The method of claim 15 wherein said selectively using comprises using said bitstream to operate a switch to control the application of said second current to said capacitor.

19. The method of claim 18 wherein said selectively using said bitstream comprises inputting said bitstream to a control terminal of a transistor.

* * * * *

UNITED STATES PATENT AND TRADEMARK OFFICE
CERTIFICATE OF CORRECTION

PATENT NO. : 7,775,710 B2 Page 1 of 1
APPLICATION NO. : 12/220577
DATED : August 17, 2010
INVENTOR(S) : Sugato Mukherjee It is certified that error appears in the above-identified patent and that said Letters Patent is hereby corrected as shown below:

On the Title Pg, Item (54) "Title", line 1, delete "MANAGEMENT" and insert -- MEASUREMENT --, therefor.

In column 1, line 1, delete "MANAGEMENT" and insert -- MEASUREMENT --, therefor.

Signed and Sealed this

Nineteenth Day of October, 2010

David J. Kappos
*Director of the United States Patent and Trademark Office*